(12) United States Patent
Zhang et al.

(10) Patent No.: US 8,620,985 B2
(45) Date of Patent: Dec. 31, 2013

(54) METHOD, SYSTEM, AND PRODUCT FOR PERFORMING UNIFORMLY FINE-GRAIN DATA PARALLEL COMPUTING

(75) Inventors: Bin Zhang, Fremont, CA (US); Ren Wu, San Jose, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 12/904,829

(22) Filed: Oct. 14, 2010

(65) Prior Publication Data
US 2012/0096244 A1    Apr. 19, 2012

(51) Int. Cl.
*G06F 17/16*    (2006.01)
(52) U.S. Cl.
USPC .......................................... 708/524

(58) Field of Classification Search
None
See application file for complete search history.

(56) References Cited

U.S. PATENT DOCUMENTS

| 6,240,437 B1 * | 5/2001 | Guttag et al. .................. 708/524 |
| 7,539,690 B2 * | 5/2009 | Zhang .................................... 1/1 |
| 8,243,083 B1 * | 8/2012 | Garland et al. ................ 345/505 |
| 2005/0108254 A1 * | 5/2005 | Zhang ............................ 707/100 |
| 2012/0096244 A1 * | 4/2012 | Zhang et al. ................... 712/222 |
| 2012/0303615 A1 * | 11/2012 | Goswami et al. ............. 707/723 |

* cited by examiner

Primary Examiner — David H Malzahn

(57) ABSTRACT

A method is disclosed that includes computing, using at least one uniformly fine-grain data parallel computing unit, a mean-square error regression within a regression clustering algorithm. The mean-square error regression is represented in the form of at least one summation of a vector-vector multiplication. A computer program product and a computer system are also disclosed.

20 Claims, 2 Drawing Sheets

METHOD, SYSTEM, AND PRODUCT FOR PERFORMING UNIFORMLY FINE-GRAIN DATA PARALLEL COMPUTING

FIELD OF THE INVENTION

The present invention relates to parallel computing. More particularly, the present invention relates to a method, computer system and computer program product for performing uniformly fine-grain data parallel computing of, for example, regression clustering.

BACKGROUND

Computing power of Central Processing Units (CPU) has dramatically increased in the last few decades, supported by both miniaturization and increasing clock frequencies. More and more electronic gates are being packed onto the same area of a silicon die as miniaturization advances. More hardware supported parallel computing, pipelining for example, has further increased the computing power of CPUs.

Frequency increases have sped up CPUs even more directly and linearly. But the long predicted physical limit of the miniaturization process seems to have finally been reached recently, so that increasing the frequency appears to be no longer feasible due to the accompanied non-linear increase of power consumption, even though miniaturization still continues today. This situation has forced the industry to go toward packing multiple CPU cores onto the same silicon die without increasing clock frequency. Parallel computing has emerged from an optional computational architecture for supercomputing into the mainstream choice for general computing, and this will likely continue in the future. As a result of this fundamental computing architecture change, algorithm design, data structure design, and programming strategies are all facing new challenges.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. It should be noted that the figures are given as examples only and in no way limit the scope of the invention. Like components are denoted by like reference numerals.

DETAILED DESCRIPTION

Figure 1:
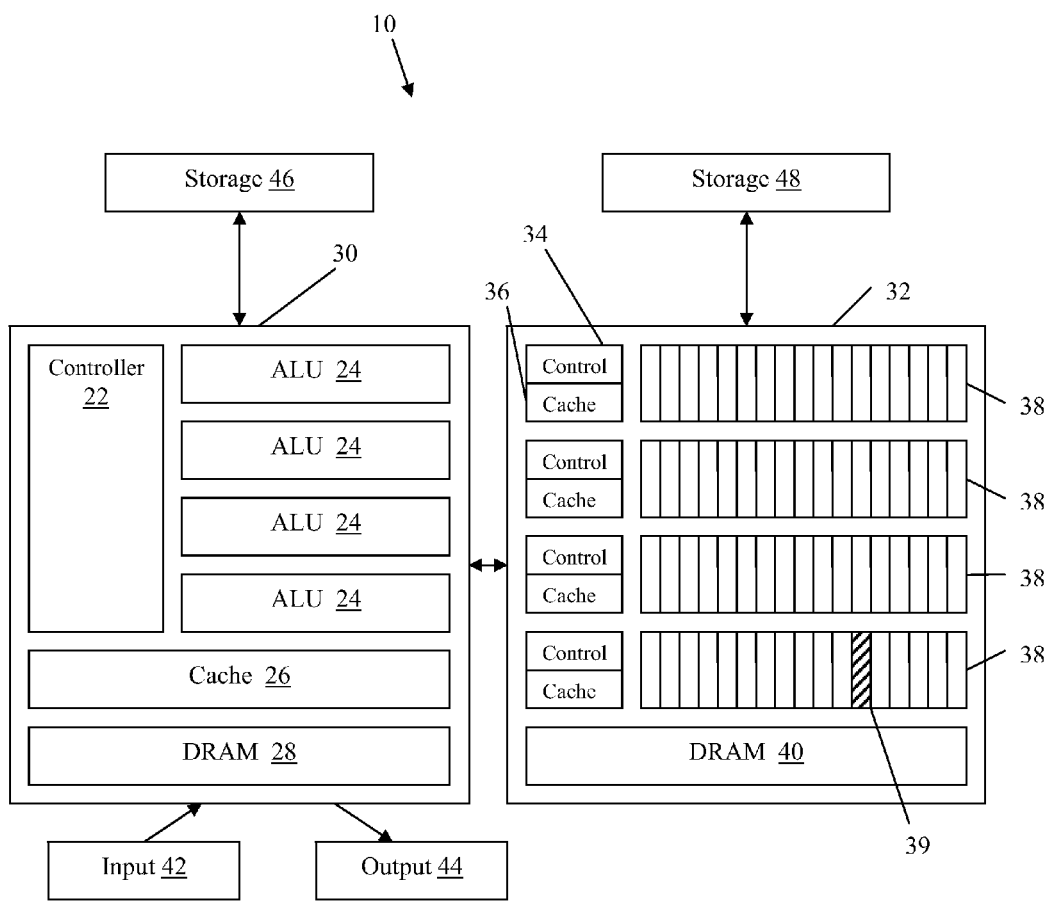
FIG. 1 illustrates a computing system of mixed computing architecture, according to embodiments of the present invention.

Graphics Processing Units (GPUs) have employed multi-core parallel computing, even longer than CPUs have, due to the parallel nature of graphics computations. Some efforts have been made to use GPUs' special architecture for more general purpose numerical computing; however, such efforts have achieved limited results and the task was very difficult until recently. It was difficult to program general purpose numerical algorithms on GPUs because of their specialized architecture for graphics processing—numerical computations had to be shaped into "graphics operations" before they could be programmed through the graphics programming interface. In the last few years, however, GPUs developed rapidly from a special graphics processing unit into General Purpose uniform multicore computing devices (called "GP-GPU"), which has made the mapping of general purpose numerical computing tasks onto the new GPU architecture much easier. An augmented C-language interface, NVIDIA's CUDA, is also available now for programming GPUs. These advances have made general purpose computing on GPUs practical for general programmers without knowledge of the graphics programming interface. The benefits of using a GP-GPU for numerical processing over CPU multicores are significant savings on both the hardware cost and power consumption per GFLOPS (Giga Floating point Operations Per Second). Measured by the number of floating point operations per second, GPUs' performance shown a significantly faster increase in the last few years than CPUs. With hundreds of light-weight multiple-data and multiple-thread processors, a GPU offers much more computational power for general purpose computing at both lower capital equipment cost and lower power consumption.

According to embodiments of the present invention, uniformly fine-grain data parallel computing may be performed on a computing device which comprises a mixed computing architecture (hereinafter "mixed computing architecture"), which may include, for example, at least one central processing unit (CPU) and at least one uniformly fine-grain data parallel computing device, such as, for example, a graphics processing unit (GPU) or a general purpose graphics processing unit (GP-GPU). "Uniformly fine-grain data parallelism" means that the size of each data partition $d_k$ in D is the same (uniform), the tasks to be performed on them are the same, and each task can access the data partition needed for its computation in as few memory-access cycles as possible. Uniformity of the size of $d_k$ helps (but does not necessarily guarantee) design a common procedure p for all threads so that the execution of these threads is truly synchronized without wasting cycles.

According to embodiments of the present invention, a method is disclosed which includes computing, using at least one uniformly fine-grain data parallel computing unit, a mean-square error regression within a regression clustering algorithm. The mean-square error regression is represented in the form of at least one summation of a vector-vector multiplication.

Aspects of the present invention may be embodied in the form of a system, a method or a computer program product. Similarly, aspects of the present invention may be embodied as hardware, software or a combination of both.

FIG. 1 illustrates a computing system 10 of mixed computing architecture, according to embodiments of the present invention, with a CPU and a GPU.

Computing system 10, according to embodiments of the present invention comprises input 42 and output 44. It further comprises at least one CPU 30 and at least one GPU 32. Each CPU 30 may include controller 22, ALUs (Arithmetic Logic Units) 24, cache memory 26 and Dynamic Random Access Memory (DRAM) 28. Each GPU 32 may include a plurality of multiprocessors 38, each including a plurality of ALUs (one such ALU is striped for ease of identification and referenced by numeral 39) and having designated controller 34 and cache memory 36, along with DRAM 40. Non-volatile storage 46 and 48, such as, for example, hard drives, may be attached to CPU 30 and/or GPU 32.

According to embodiments of the present invention, an algorithm design is presented which is intended to be executed on a mixed computing architecture to perform uniformly fine-grain data parallel computing.

A general design for a uniformly fine-grain data parallel computing system and method thereof, according to embodiments of the present invention is disclosed hereinafter.

By way of example, this design principle is demonstrated by applying it to the design of two machine learning algorithms: clustering and regression clustering—on a GPU/CPU mixed computing architecture, and presenting performance comparisons. The design principle according to embodiments of the present invention is applicable to other classes of algorithms, such as, for example, numerical computation algorithms that are computationally dominated by matrix operations on dense matrices.

A GPU may typically include a set of light-weight data parallel cores, which are grouped into a set of multiprocessors 38. The cores within the same multiprocessor may include a small bank of low access-latency shared memory (cache 36). The cores in different multiprocessors may communicate through the global memory of the GPU, e.g., DRAM 40, which has a much longer access-latency than the shared memory. The execution threads are organized in blocks; the threads within the same block are always executed on the same multiprocessor through their lifetime, while multiple blocks of threads can be loaded to the same multiprocessor and executed in a multiplexed fashion to hide the memory access latencies.

In a typical GPU there may exist a plurality of multiprocessors 38, each sharing the same program logic and the same cache memory 36. All Arithmetic Logic Units (ALU) of the same multiprocessor 38 may execute the same line of code synchronously.

According to embodiments of the present invention, carefully designing the code to minimize the number of steps that have to be included into a conditional execution block may allow for achieving higher utilization of the processors.

Computing threads on a GPU may be organized into thread blocks, typically with up to 3-dimensional indices (thread IDs). Many thread blocks are organized into a thread grid (with block IDs), which is the unit of launch for execution. Enough thread blocks may be necessary to keep all the multiprocessors 38 busy. For example, NVIDIA offers a CUDA Occupancy Calculator spreadsheet for choosing the right number of threads in a thread block and the right number of thread blocks. Threads are linked to data for data parallel computing by mapping the block IDs and thread IDs to data indices.

For example, the augmented C-programming interface from NVIDIA, called CUDA, provides a set of function calls to assist the programmer to allocate GPU memory, copy data between CPU memory and GPU memory, organize parallel computing threads, and start execution of the threads on GPU 32. In the same C program, CUDA allows programmers to specify if a C function is to be executed on CPU 30, GPU 32 or both.

Not all algorithms fit well on a GPU. Hereinafter a subclass of algorithms is presented, which can be described as uniformly fine-grain data parallel algorithms that fit particularly well on a GPU.

Data parallelism is a type of parallel computing structure. Let $D=\{d_k\}_{k=0}^{K-1}$ be a partition of a data set that the computation procedure p is applied to in parallel. Each $d_k$ is a partition. A set T of K computing threads, $T=\{t_k\}_{k=0}^{K-1}$ are allocated and data parallelism can expressed as $$t_k{:}p(d_k)\text{--computing thread } t_k \text{ executes the procedure } p \text{ on data } d_k. \quad (1)$$

In this form, nothing is shared among different threads. Therefore they can all perform in parallel without blocking (waiting) for one another. Since some computing architectures, NVIDIA's GPUs for example, support broadcasting, which is synchronized reading by many threads from the same location of memory, shared parameters are allowed without losing performance, which can be written as $$t_k{:}p(\text{shared\_read\_only\_parameters},d_k). \quad (2)$$

As an alternative, such parameters can also be embedded in the code as string literals. Different threads in this data parallel computing structure share no variables that are written to. This property is referred to in the present specification as "Share No Written Variables" (SNWV).

EXAMPLE 1

A simple aggregation task over N numerical numbers is considered:

$$S = \sum_{i=0}^{N-1} x_i. \quad (3)$$

This task can be broken down into two steps, the first step being completely data parallel, using K helping variables. The data set may be partitioned into K segments, assuming that K divides evenly into N (otherwise pad the data sequence with some zeros at the end), and perform the following two steps:

Step 1:

$$S_k = \sum_{i=k*M}^{(k+1)*M-1} x_i$$

where M=N/K is the number of data values in each partition $d_k=\{x_i\}_{kM}^{(k+1)M-1}$. This step is data parallel satisfying SNWV.

Step 2:

$$S = \sum_{k=0}^{K-1} S_k,$$

where each $S_k$ is the partial summation on $d_k=\{x_i\}_{kM}^{(k+1)M-1}$ for calculating total summation S.

The method in this example is very general. The concept of sufficient statistics may be followed to create data parallel computing segments satisfying SNWV for a general statistical estimator S by first breaking the whole data set into partitions, $D_1, \ldots, D_L$, and then estimating a set of sufficient statistics for S on each partition, $$\sigma_{1,1} \ldots \sigma_{1,m} \text{ on } D_1,$$

$$\sigma_{2,1} \ldots \sigma_{2,m} \text{ on } D_2,$$

... and $$\sigma_{L,1} \ldots \sigma_{L,m} \text{ on } D_L. \quad (4)$$

All these sufficient statistics are collected to calculate S. Calculating S may be performed iteratively, such as in K-means, or recursively, forming a tree of computing tasks. Associated with this tree of computing tasks is hierarchical partitioning of the data set down to smaller and smaller sizes. Iteration and recursion can be combined too.

Using the iterative calculation method for calculating statistical estimator S, a number of clustering algorithms, including K-means, Expectation-Maximization ("EM") and K-Harmonic Means, can be implemented as distributed computing on partitioned data sets. The larger the data set at each location, the more practical and economical it is to perform distributed/parallel computing because the cost of communicating the sufficient statistics per scan of the data remains a constant, independent of the number of data samples in the data sets. The larger the data size, the higher the ratio between the computing cost at each site and the communication cost between sites, and the more economical.

Following the same principle, according to embodiments of the present invention, we find data parallel segments in K-means and K-means regression clustering for their implementation on a GPU, which is also the principle followed by Map-Reduce, a software framework that supports distributed/parallel computing.

The recursive subdivision of data parallel computing may contribute to the layout of computing tasks on a GPU because both the hardware and software platforms of a GPU show a multilevel integration. At the hardware level, a typical GPU consists of a number of identical multiprocessors, which communicate through the global memory they share. Each multiprocessor 38 consists of a number of ALU cores that share the same control unit 34 and cache 36 (registers, cache and shared memory among the ALUs in the multiprocessor are all from the same physical memory on the GPU chip).

At the software level, a thread block, as discussed above, may be executed on a multiprocessor. The thread block may have several times more execution threads than the number of ALUs in the multiprocessor. These threads may be executed in warps in a time-sharing fashion. Multiple thread blocks can be assigned to the same multiprocessor (time-sharing).

At both the hardware and software levels, a hierarchical subdivision may be present down to the individual computing cores and individual computing threads.

As mentioned above, not all algorithms fit well on a GPU. Scattered writes to memory may hamper performance on most GPUs. These properties of a GPU limit the kind of programs that can run well on it. Many computations on dense matrices and vectors seem to best fit on GPUs, due to the natural uniformly fine-grain data parallelism in the algorithms on matrices and vectors. When coalesced memory access, which is defined as a synchronized access to a continuous chunk of memory through a memory channel, is well-aligned with memory chunk boundaries, the program running on a GPU may achieve higher performance. Fine-grained data parallel design helps to package the memory accesses of all ALU cores in a multiprocessor into a fewer number of coalesced memory accesses to reduce the total data access time.

According to embodiments of the present invention, before programming an algorithm on GPU, uniformly fine-grain data parallelism is sought in the algorithm to facilitate writing the code with coalesced memory access patterns. This step often involves rewriting an existing algorithm in a way to expose its fine-grain data parallel structure so as to improve the performance of its implementation on a GPU. On NVIDIA's GPU, for example, a coalesced memory access significantly improves the performance of a program. A multiprocessor can read up to a maximal number of contiguous bytes (typically 128 today) that are well-aligned with global memory blocks in a single memory-access cycle. Thus, when writing the code for the algorithm to be executed on the GPU, the data on which the algorithm operates is arranged into segments of up to a maximal number of contiguous bytes. These segments are those which can be read in one or a few memory-access cycles. Fine-grain data items help to pack a compact contiguous memory block for coalesced access, which keeps the utilization of both memory bandwidth and processor cycles high. This is demonstrated below.

As mentioned above, uniformly fine-grain data parallelism means that the size of each data partition $d_k$ in D is the same (uniform), the tasks to be performed on them are the same, and each task can access the data partition needed for its computation in as few memory-access cycles as possible. Uniformity of the size of $d_k$ helps (but does not guarantee) design a common procedure p for all threads so that the execution of these threads is truly synchronized without wasting cycles.

EXAMPLE 2

The same aggregation task of Example 1 is reexamined:

$$S = \sum_{i=0}^{N-1} x_i.$$

Example 2 deals with designing a uniformly fine-grain data parallel program to perform this aggregation task. Note that when the data is loaded into memory in its indexed ordering, the choices of data partitions $d_k = \{x_i\}_{kM}^{(k+1)M-1}$ in Example 1 are not fine grain. The partition at the individual data value level $d_k = \{x_k\}$, however, satisfies the uniformly fine-grain requirement. Let thread $p_m$ be a simple accumulating operation on data $x_k$ $$p_m(x_k) : s_m + = x_k. \quad (5)$$

When the data set $\{x_i\}_{i=0}^{N-1}$ is loaded into a block of memory with continuous memory addresses, the threads $p_m$, m=1, ..., M, are run in parallel as follows:

at time $t_1$: $p_1(x_1), p_2(x_2), \ldots p_M(x_M)$ at time $t_{1+\delta}$: $p_1(x_{M+1}), p_2(x_{M+2}), \ldots p_M(x_{2M})$; and at time $t_{1+j\delta:p1}(x_{jM+1}), p_2(x_{jM+2}), \ldots p_M(x_{(j+1)M})$ where j=0, ... N/K; δ is the amount of time to finish one line of work above.

One of the advantages of such fine-grain data parallel structure, according to embodiments of the present invention, is obtaining coalesced memory access on the data items $x_1, x_2, \ldots, x_M$ and so on. Again, this example is simple, but the fine-grain data parallel idea demonstrated here goes beyond this simple example.

The K-means clustering algorithm is now discussed to demonstrate the idea of uniformly fine-grain data parallel computing with SNWVs.

K-means is a popular clustering algorithm in data mining Let X={$x_i$|i=1, ..., N} be a dataset with K clusters, independently and identically (iid) sampled from a hidden distribution, and M={$m_k$|k=1, ..., K} be a set of K centers. K-means starts with initializing a set of centers and iteratively refines the location of these centers to find the clusters in a dataset. K is chosen by the practitioner. Here are the steps:

K-Means Algorithm:
Step 1: Initialize all centers (randomly or based on some heuristics).
Step 2: Associate each data point with the nearest center. This step partitions the data set into K disjoint subsets (Voronoi Partition).
Step 3: Calculate the best center locations (i.e. the centroids of the partitions) to maximize a performance function (6), which is the total squared distance from each data point to the nearest center.
Repeat Step 2 and Step 3 until there are no more changes in the membership of the data points (proven to converge in a finite number of steps).

This algorithm ensures convergence to only a local optimum of the following performance function:

$$Perf_{KM}(X, M) = \sum_{k=1}^{K} \sum_{x \in S_k} \|x - m_k\|^2, \quad (6)$$

where $S_k \subset X$ is the subset of x that are closer to $m_k$ than to all other centers.

The quality of the converged results, measured by the performance function above, could be far from its global optimum.

The time complexity per iteration for K-means is linear in the size of the dataset N, the number of clusters K, and the dimensionality of data D. The number of iterations it takes to converge is very insensitive to N.

Clustering applies to datasets without response information (i.e., unsupervised), while regression applies to datasets with response variables chosen. Replacing the "center points" in K-means by more complex data model "centers," especially regression models, creates a model-based clustering algorithm called regression clustering.

Given a training dataset with responses $y_i$, $Z=(X,Y)=\{(x_i, y_i)|i=1,\ldots,N\}$, a family of functions $\Phi=\{f\}$ (a function class making the optimization problem well defined, such as polynomials of up to a certain degree), and a loss function $e(\,)\geq 0$, regression solves the following minimization problem:

$$f^{opt} = \underset{f \in \Phi}{\operatorname{argmin}} \sum_{i=1}^{N} e(f(x_i), y_i) \quad (7)$$

Commonly, $$\Phi = \left\{ \sum_{l=1}^{m} \beta_l h(x, a_l) \mid \beta_l \in R, a_l \in R^n \right\}$$

is a linear expansion of simple parametric functions such as polynomials of degree up to m, Fourier series of bounded frequency, and neural networks. Usually, $e(f(x),y)=\|f(x)-y\|^p$, with p=1 or 2 most widely used.

Regression in Eq. (6) is not effective when the data set contains a mixture of very different response characteristics. Finding the partitions in the data and learning a separate function on each partition is the idea of Regression-Clustering (RC). Regression provides a model for the clusters, while clustering partitions the data to best fit the models. The linkage between the two algorithms is a common objective function shared between the regressions and the clustering.

RC algorithms can be viewed as replacing the K point-based centers in center-based clustering algorithms by a set of model-based centers—particularly a set of regression functions $M=\{f_1,\ldots,f_K\} \subset \Phi$. The performance function is similar to the K-means performance function, but the distance from a data point to a center is replaced by the residue regression error $(e(f(x),y)=\|f(x)-y\|^2)$ $$d((x, y), M) = \underset{f \in M}{\operatorname{MIN}}(e(f(x), y)) \text{ for } RC\text{-}KM \quad (8)$$

RC-K-means may involve the following steps:
Step 1: initialize the regression functions.
Step 2: associate each data point (x,y) with the regression function that provides the best approximation $$(\underset{k}{\operatorname{argmin}} \{e(f_k(x), y) \mid k = 1, \ldots, K\}.$$

This step partitions the data set into K partitions.
Step 3: calculate (or recalculate) the regression function on each data partition that maximizes the performance function (or best-fit).
Step 4: repeat Steps 2 and 3 until no more data points change their membership.

Comparing these steps with the steps of K-means, the differences are that point-centers are replaced by regression functions, and the distance from a point to a center is replaced by the residue error of a pair (x,y) approximated by a regression function.

Like K-means, K-means regression clustering also has two phases for each of the iterations—membership calculation and calculating the new center-functions. The membership calculation step is performed similarly to the K-means: all K functions are loaded into the constant memory of all multi-processors used as "parameters" to the common code executed by all threads. Each thread is responsible for calculating the cluster membership of one data point. The second step, calculating the new center-functions, is more complicated.

In the regression step, it is assumed that a simple linear regression is performed on the data (the details of the matrix A in the formula below depends on the function class from which the regression functions are selected). The data points in each cluster are used to update the center-function with which they are associated by an MSE regression for the best fit to the data in the cluster. Let $$A = \begin{bmatrix} x_{i_1} \\ x_{i_2} \\ \ldots \\ x_{i_L} \end{bmatrix}, b = \begin{bmatrix} y_{i_1} \\ y_{i_2} \\ \ldots \\ y_{i_L} \end{bmatrix} \quad (9)$$

be one of the clusters with its data vectors listed as rows in a matrix A and vector b. The coefficients of the new center-function of this cluster are calculated as $$c=(A^T A)^{-1} A^T b. \quad (10)$$

To see the data parallel structure in computing the vector c, the matrix multiplication and the vector multiplication in the formula above are rewritten as summations over vector-vector multiplications formed from the data points or coefficients, $$A^T A = \sum_{l=1}^{L} x_{i_l}^T x_{i_l} \text{ and } A^T b = \sum_{l=1}^{L} x_{i_l}^T b. \tag{11}$$

Formula (11) shows the data parallel structure of the computing task, and the work can be naturally partitioned and assigned to thread blocks running in parallel.

Figure 2:
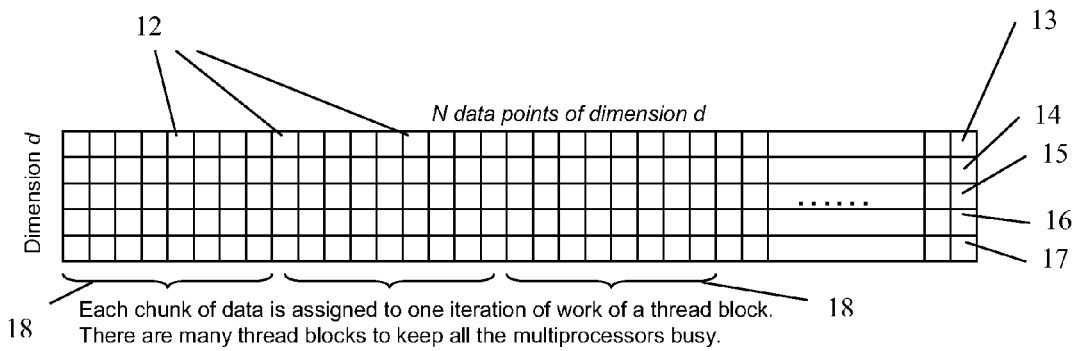
FIG. 2 illustrates assignment of work to thread blocks running in parallel, according to embodiments of the present invention.

FIG. 2 illustrates assignment of work to thread blocks running in parallel, according to embodiments of the present invention. There may exist N data points (e.g. data points 12 along the top row of the grid shown in FIG. 2) for each dimension (of Dimension d, e.g. the dimensions indicated by numerals 13, 14, 15, 16 and 17). Each segment (chunk 18) of data may be assigned to one iteration of work of a thread block. There may be many thread blocks to keep all of the multiprocessors busy.

The same thread block may work on multiple data segments in (for-loop) iterations. Following the distributed computing scheme in FIG. 2, these sums can be computed in two phases over any partition of the data. This scheme helps to break the work into many independent segments. The data may be segmented into many equal-sized segments, so that each segment of data is assigned to one block of threads running on a single multiprocessor.

Within one thread block, which is run on a single multiprocessor with shared memory (cache), detailed fine-grain computation is applied to the calculation of $\Sigma x_{i_j}^T x_{i_j}$ and $\Sigma x_{i_j}^T b$, where summation is over the block of data points assigned to the multiprocessor.

Figure 3:
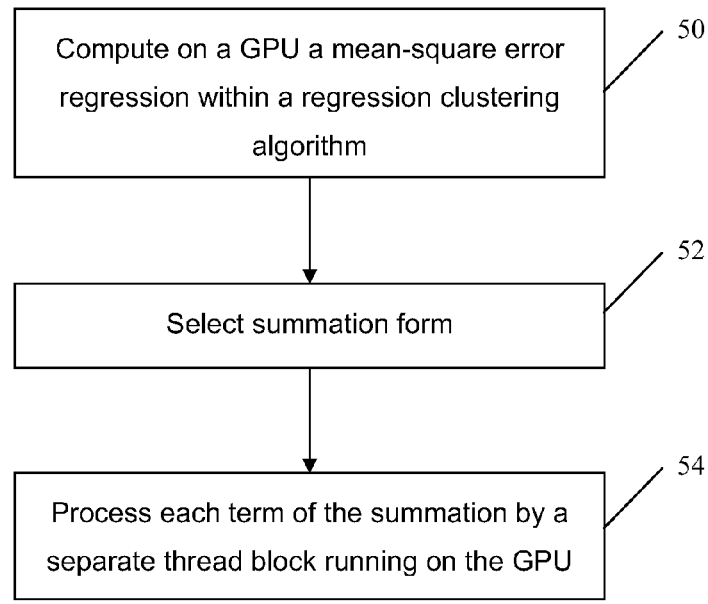
FIG. 3 is a flowchart illustrating some operations of a method for performing a regression clustering algorithm, according to embodiments of the present invention.

FIG. 3 is a flowchart illustrating some operations of a method for performing a regression clustering algorithm, according to embodiments of the present invention. In operation 50, a mean-square error regression within a regression clustering algorithm may be computed on a GPU. The mean-square error regression may be represented in the form of at least one summation of a vector-vector multiplication. In operation 52, the summation form is selected from the group of summation forms consisting of $$A^T A = \sum_{l=1}^{L} x_{i_l}^T x_{i_l} \text{ and } A^T b = \sum_{l=1}^{L} x_{i_l}^T b.$$

In operation 54, each term of the summation is processed by a separate thread block running on the GPU.

In order to compare the performance of a GPU/CPU implementation with that of a CPU-only implementation, first a competitive CPU-only implementation is established. An existing software package, MineBench, which is a data mining benchmark suite used in computer architecture research, was used as a baseline for performance comparison so as to align with previously published results. The inventors' own CPU version of the K-means algorithm was implemented for more accurate comparisons. Two machines were used in experiments, both HP XW8400 workstations with dual quad core Intel Xeon 5345 running at 2.33 GHz, each equipped with an NVIDIA GeForce GTX 280, with 1 GB onboard device memory; one machine had 4 GB of memory running Windows XP, and the other had 20 GB of memory running Windows XP x64. The GPU code was developed in CUDA on top of Microsoft Visual C++ 2005.

Randomly generated data sets were produced. The maximum number of iterations was limited to 50 for all experiments because, for the purpose of speedup comparison, it was sufficient to obtain the per-iteration cost. The timing reported is the total wall time for all iterations, including both the time for calculation and communication between the CPU and the GPU, but without the time for initializing the data sets. Both CPU and GPU/CPU versions give identical new centers under identical initializations of the centers. This confirms the algorithmic correctness of the GPU/CPU implementation.

Since both the K-means clustering algorithm and the K-means regression clustering algorithm have similar structure and the CPU-only versions share most implementation optimizations as well, it may be reasonable to assume that a CPU version performs reasonably well. However, that would be incorrect.

Table 1 exhibits the performance comparison experiments results. The GPU/CPU accelerated version offers more than 100 times speed-up performance over the CPU-only version running on a single core. The GPU/CPU accelerated version scales even better with larger datasets and larger number of clusters.

TABLE 1

| Dataset | | | | Time (s) | | |
|---|---|---|---|---|---|---|
| N | D | K | M | CPU | GPU | Speed up (x) |
| 262144 | 4 | 100 | 50 | 59.41 | 0.95 | 62.5 |
| 262144 | 4 | 200 | 50 | 111.80 | 1.19 | 93.9 |
| 262144 | 4 | 400 | 50 | 215.81 | 1.67 | 129.2 |
| 524288 | 4 | 100 | 50 | 119.77 | 1.80 | 66.5 |
| 524288 | 4 | 200 | 50 | 224.33 | 2.22 | 101.0 |
| 524288 | 4 | 400 | 50 | 433.33 | 3.00 | 144.4 |
| 1048576 | 4 | 100 | 50 | 243.08 | 3.50 | 69.5 |
| 1048576 | 4 | 200 | 50 | 455.55 | 4.23 | 107.7 |
| 1048576 | 4 | 400 | 50 | 873.86 | 5.66 | 154.4 |

From the above table, the average speed-up, which is indicated in the last column, is around 103. A typical NVIDIA GPU sells for a few hundred dollars each. When fully loaded, it may use about 300 Watts of power and can solve numerical problems about 40 or more times faster than a CPU (using 50 Watts of power) can.

In sum, according to embodiments of the present invention, uniformly fine-grain data parallel computing may be performed on a computer system of mixed computing architecture that includes at least one CPU and at least one such uniformly fine-grained data parallel processing engine, such as a GP-GPU. Data parallel algorithms which are to be executed on such a computer system may be designed to handle data organized in equal data segments. According to embodiments of the present invention, each of the data segments may include a maximal number of contiguous bytes accessible in one or a few memory-access cycles.

Designing algorithms in this way provides some advantages. First, different vector multiplications can be done completely independently of each other because there is no data sharing between any two of them. Second, the size of each vector multiplication is much smaller and easier to fit onto the multiprocessors of the GPU. These advantages apply to any multiplication of matrices that have a smaller number of columns (or rows) such that after converting to a sum of vector multiplications, the vector multiplications can be fitted to the available hardware resources in one or a few memory-access cycles. The advantages also appear in numerical computation algorithms that are computationally dominated by matrix operations on dense matrices with few columns or rows.

Embodiments of the present invention may be useful in data analysis, data fitting by analytical functions (regression), data mining, solving ordinary differential equations, partial differential equations, and difference equations, and in optimization and control of complex systems.

Aspects of the present invention may be embodied as a computer program product saved on one or more computer-readable mediums in the form of computer-readable program code embodied thereon. For example, the computer-readable medium may be a computer-readable signal medium or a computer-readable non-transitory storage medium. A computer-readable storage medium may be, for example, an electronic, optical, magnetic, electromagnetic, infrared, or semiconductor system, apparatus, or device, or any combination thereof.

A computer-readable signal medium may include a propagated data signal with computer-readable program code embodied therein, for example, in baseband or as part of a carrier wave. Such a propagated signal may take any of a variety of forms, including, but not limited, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Computer program code in embodiments of the present invention may be written in any suitable programming language. The program code may execute on a single computer, or on a plurality of computers.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method, implemented by at least one processor executing instructions stored in a non-transitory computer-readable storage medium, for performing a regression clustering algorithm, comprising:
computing, using at least one uniformly fine-grain data parallel computing unit, a mean-square error regression within a regression clustering algorithm, said mean-square error regression represented in the form of at least one summation of a vector-vector multiplication.

2. The method as claimed in claim 1, wherein said at least one summation of a vector-vector multiplication includes calculating summations over data points in at least one summation form selected from the group of summation forms consisting of $$A^T A = \sum_{l=1}^{L} x_{i_l}^T x_{i_l} \text{ and } A^T b = \sum_{l=1}^{L} x_{i_l}^T b,$$

where A is a matrix and b is a vector, $$A = \begin{bmatrix} x_{i_1} \\ x_{i_2} \\ \ldots \\ x_{i_L} \end{bmatrix}, b = \begin{bmatrix} y_{i_1} \\ y_{i_2} \\ \ldots \\ y_{i_L} \end{bmatrix}.$$

3. The method as claimed in claim 1, wherein each term of said at least one summation of a vector-vector multiplication is processed by a separate thread block running on said at least one uniformly fine-grain data parallel computing unit.

4. The method as claimed in claim 1, wherein said at least one uniformly fine-grain data parallel computing unit comprises at least one general purpose graphics processing unit.

5. The method as claimed in claim 1, further comprising:
initializing regression functions with respect to a data set;
associating data points with the regression functions, such that each of the data points is associated with one of the regression functions that provides a best approximation;
partitioning the data set into a predetermined number of partitions; and
calculating, for each of the data points, the associated regression function on each of the partitions that maximizes a performance function.

6. The method as claimed in claim 5, further comprising repeating the steps of associating the data points with the regression functions and recalculating for each of the data points the associated regression function until none of the data points changes membership.

7. The method as claimed in claim 1, wherein data points are organized into equal data segments, each of the data segments including a maximal number of contiguous bytes accessible within several memory-access cycles.

8. The method as claimed in claim 7, wherein each of the data segments includes a maximal number of contiguous bytes accessible in a single memory-access cycle.

9. A computer program product stored on a non-transitory tangible computer-readable storage medium, the computer program including code for:
computing, using at least one uniformly fine-grain data parallel computing unit, a mean-square error regression within a regression clustering algorithm, said mean-square error regression represented in the form of at least one summation of a vector-vector multiplication.

10. The computer program product as claimed in claim 9, wherein the computing includes calculating summations over data points in at least one summation form selected from the group of summation forms consisting of $$A^T A = \sum_{l=1}^{L} x_{i_l}^T x_{i_l} \text{ and } A^T b = \sum_{l=1}^{L} x_{i_l}^T b,$$

where A is a matrix and b is a vector, $$A = \begin{bmatrix} x_{i_1} \\ x_{i_2} \\ \ldots \\ x_{i_L} \end{bmatrix}, b = \begin{bmatrix} y_{i_1} \\ y_{i_2} \\ \ldots \\ y_{i_L} \end{bmatrix}.$$

11. The computer program product as claimed in claim 9, wherein each term of said at least one summation of a vector-vector multiplication is processed by a separate thread block running on said at least one uniformly fine-grain data parallel computing unit.

12. The computer program product as claimed in claim 9, wherein the code further includes instructions for:
   initializing regression functions with respect to a data set;
   associating data points with the regression functions, such that each of the data points is associated with one of the regression functions that provides a best approximation;
   partitioning the data set into a predetermined number of partitions; and
   calculating, for each of the data points, the associated regression function on each of the partitions that maximizes a performance function.

13. The computer program product as claimed in claim 12, wherein the code further includes instructions for repeating the steps of associating the data points with the regression functions and recalculating for each of the data points the associated regression function until none of the data points changes membership.

14. The computer program product as claimed in claim 9, wherein data points are organized into equal data segments, each of the data segments including a maximal number of contiguous bytes accessible within several memory-access cycles.

15. The computer program as claimed in claim 14, wherein each of the data segments includes a maximal number of contiguous bytes accessible in a single memory-access cycle.

16. A computer system implemented by at least one processor executing instructions stored in a non-transitory computer-readable storage medium comprising:
   a graphics processing unit for calculating a matrix operation on at least one dense matrix in a numerical computation algorithm, said matrix operation comprising at least one summation of a vector-vector multiplication over data points,
   wherein the data points are organized into equal data segments, each of the data segments including a maximal number of contiguous bytes accessible within several memory-access cycles.

17. The computer system as claimed in claim 6, wherein each of the data segments includes a maximal number of contiguous bytes accessible in a single memory-access cycle.

18. The computer system as claimed in claim 16, wherein the numerical computation algorithm is a regression clustering algorithm.

19. The computer system as claimed in claim 18, wherein said at least one summation of a vector-vector multiplication includes calculating summations over data points in at least one summation form selected from the group of summation forms consisting of $$A^T A = \sum_{l=1}^{L} x_{i_l}^T x_{i_l} \text{ and and } A^T b = \sum_{l=1}^{L} x_{i_l}^T b,$$

where A is a matrix and b is a vector, $$A = \begin{bmatrix} x_{i_1} \\ x_{i_2} \\ \dots \\ x_{i_L} \end{bmatrix}, b = \begin{bmatrix} y_{i_1} \\ y_{i_2} \\ \dots \\ y_{i_L} \end{bmatrix}.$$

20. The computer system as claimed in claim 16, comprising at least one central processing unit.

* * * * *

UNITED STATES PATENT AND TRADEMARK OFFICE
CERTIFICATE OF CORRECTION

PATENT NO.         : 8,620,985 B2
APPLICATION NO.    : 12/904829
DATED              : December 31, 2013
INVENTOR(S)        : Bin Zhang et al.

Page 1 of 1

It is certified that error appears in the above-identified patent and that said Letters Patent is hereby corrected as shown below:

In the Claims

In column 13, line 30, in Claim 16, delete "medium" and insert -- medium, --, therefor.

In column 14, line 5, in Claim 17, delete "6," and insert -- 16, --, therefor.

In column 14, line 20, in Claim 19, delete "and and" and insert -- and --, therefor.

Signed and Sealed this
Thirteenth Day of May, 2014

Michelle K. Lee
*Deputy Director of the United States Patent and Trademark Office*